United States Patent [19]

Yasuno et al.

[11] 4,204,119
[45] May 20, 1980

[54] METHOD OF READING THERMOLUMINESCENT DOSIMETER

[75] Inventors: Yoshitake Yasuno, Kyoto; Masafumi Watari, Moriguchi; Hiroshi Tsutsui; Masaru Ikedo, both of Neyagawa; Osamu Yamamoto, Hirakata, all of Japan

[73] Assignee: Matsushita Electric Industrial Co., Ltd., Osaka, Japan

[21] Appl. No.: 835,341

[22] Filed: Sep. 21, 1977

[30] Foreign Application Priority Data

Sep. 22, 1976 [JP] Japan ............................... 51-113926
Sep. 22, 1976 [JP] Japan ............................... 51-113932

[51] Int. Cl.² .............................................. G01T 1/11
[52] U.S. Cl. ................................................... 250/337
[58] Field of Search ............................... 250/337, 484

[56] References Cited

U.S. PATENT DOCUMENTS 3,531,641 9/1970 Weissenberg ......................... 250/337
3,610,926 10/1971 Kastner et al. .................. 250/337 X

*Primary Examiner*—Davis L. Willis
*Attorney, Agent, or Firm*—Wenderoth, Lind & Ponack

[57] ABSTRACT

A method of thermoluminescent dosimetry employing infrared radiation heating of a dosimeter. An incandescent lamp is used for the source of infrared radiation. The dosimeter is provided with a infrared radiation absorbing layer connected thermally to a thermoluminescent material layer. The infrared radiation absorbing layer is irradiated with infrared radiation, so that thermoluminescent material is not directly irradiated. The lamp is initially powered whereby the dosimeter is heated by infrared radiation of such high intensity as to tend to cause a heat equilibrium in the dosimeter above the temperature where thermal radiation is generated from the dosimeter. Then the power supplied to the lamp is cut or decreased, so that the dosimeter is heated by the afterglow of the lamp. Therefore the rate of temperature rise of the dosimeter becomes quite slow in the latter half of heating process, whereby the temperature of dosimeter easily falls into the required range.

6 Claims, 14 Drawing Figures

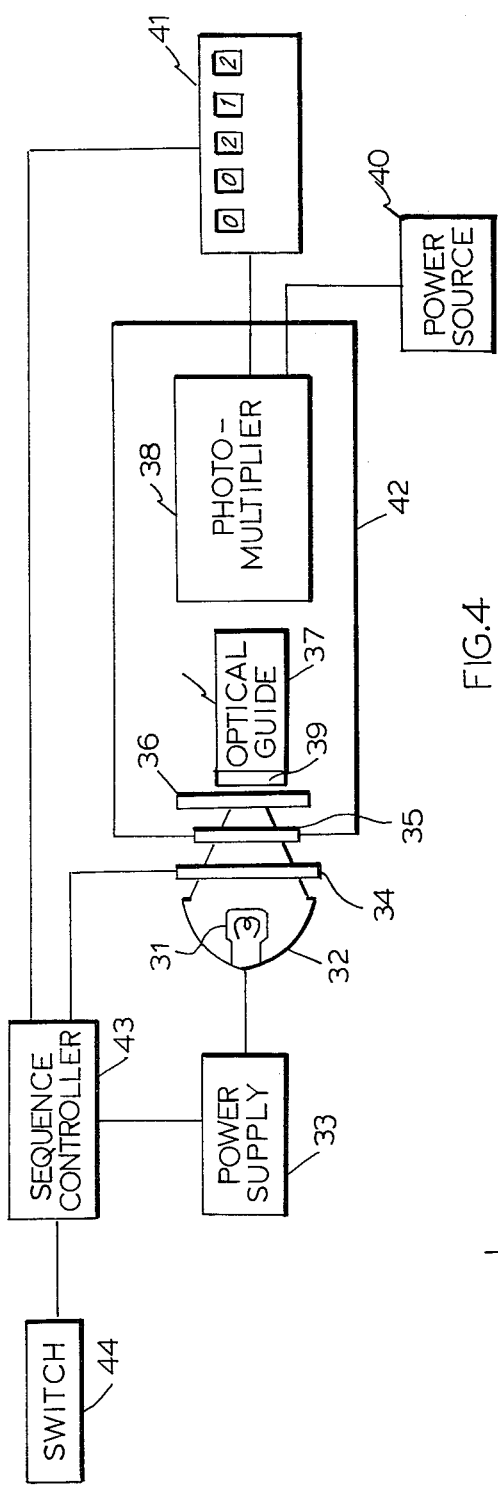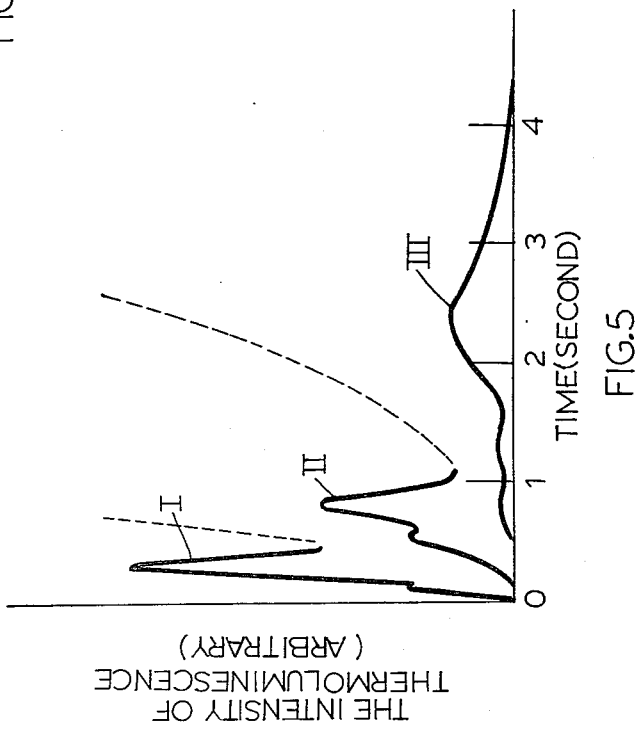

METHOD OF READING THERMOLUMINESCENT DOSIMETER

BACKGROUND OF THE INVENTION

The present invention relates to a method of thermoluminescent dosimetry and more particularly to such method in which reading of thermoluminescent dosimeter is preformed by infrared beam heating.

In thermoluminescent dosimetry, heating of the dosimeter element is one of the important techniques. The heating must meet the following two requirements.
(1) To rapidly reach the required temperature (generally 250° C. to 300° C.).
(2) Not to exceed 400° C. (because the noise signal of thermal radiation becomes remarkably large at temperatures above 400° C.).
The temperature of requirement (1) is the emission completing temperature which is defined as follows:

It is known the thermoluminescence is completely emitted when a dosimeter is heated to the specified temperature which value is dependent upon the phosphor material. It is also known that if the heating of the dosimeter is kept at a temperature below this specified temperature, it takes an extreamly long time to complete the emission of thermoluminescence. This specified temperature is referred to hereinafter as the emission completing temperature.

Hitherto developed techniques are contact heating, heating by hot air jet, heating by infrared beam and heating by high frequency induction. Heating by hot air jet can easily meet the requirement because it assumes a temperature-controlled system. This technique, however, has a difficulty in that it requires a large-scale heat-exchanger for obtaining the hot air jet.

On the other hand, heating by infrared beam enables non-contact heating by a simple construction and enables exclusive heating of small area. However since this technique must essentially be a heating-power controlled type, above-mentioned requirements cannot be easily met thereby.

SUMMARY OF THE INVENTION

It is an object of the present invention to provide a method of reading thermoluminescent dosimeter by infrared heating in which the heating process is easily controlled so as to meet above mentioned requirements for heating.

BRIEF DESCRIPTION OF THE DRAWINGS

FIG. 4 is a block diagram illustrating a thermoluminescent dosimeter reading apparatus of the infrared heating type embodying the present invention;

FIG. 5 is a graph illustrating the glow curve of a thermoluminescent dosimeter explaining the problem in infrared radiation heating;

DETAILED DESCRIPTION OF THE INVENTION

Figure 1:
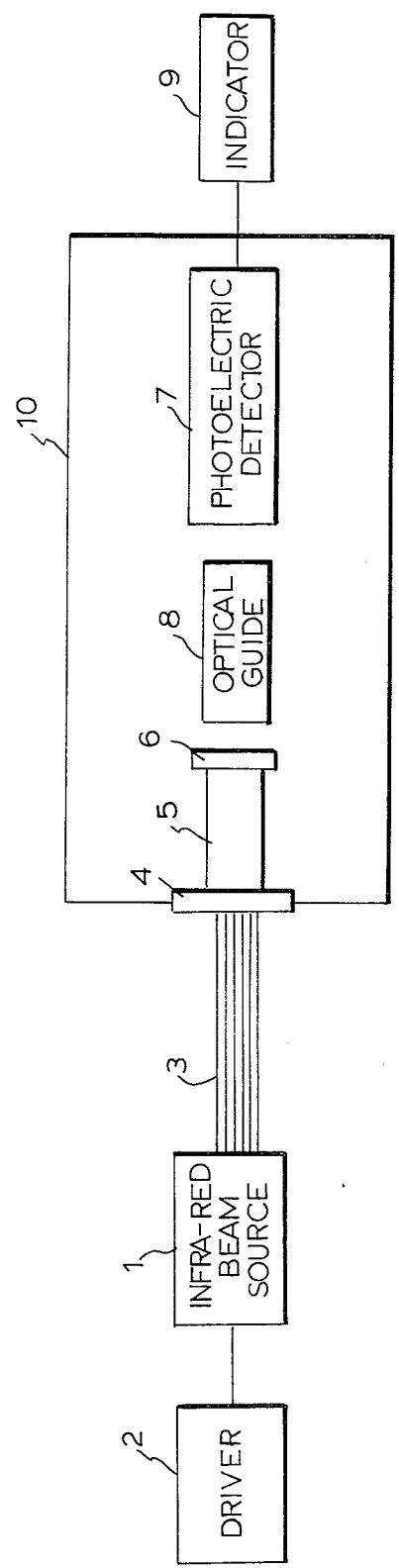
FIG. 1 is a block diagram illustrating a general construction of a thermoluminescent dosimeter reading apparatus employing infrared heating.

The basis construction of a thermoluminescent dosimeter reading apparatus is illustrated in FIG. 1. Numeral 1 represents a infrared beam source which is driven by driver 2. Emitted radiation 3 from the infrared beam source 1 may contain visible light rays and is directed to a optical filter 4. The filter 4 transmits infrared rays but cuts off visible rays, so that infrared radiation 5 without visible light rays is obtained after the filter 4. A thermoluminescent dosimeter 6 is positioned so as to be irradiated with the infrared radiation 5. Thermoluminescence emitted from the dosimeter 6 is guided to a photoelectric detector 7 through a optical guide 8. The detection signal of the detector 7 is transmitted to a indicator 9. The dosimeter 6, the optical guide 8 and the detector 7 are enclosed within a box 10 which shields apparatus from light.

The measurement of radiation dose with this apparatus is performed as follows:

First the dosimeter 6 irradiated with radiation is placed at the measuring position. Then the infrared beam source 1 is actuated and emitted radiation 3 is filtered by filter 4 to be pure infrared radiation 5. The dosimeter 6 absorbs the infrared radiation 5 and rises in temperature, so that it emits thermoluminescence. The emitted thermoluminescence is transmitted to the detector 7 and converted into an electric signal. The signal is indicated by the indicator 9.

Figure 2A:
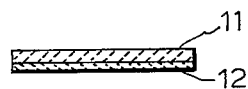
FIGS. 2A–2C are schematic sectional views illustrating a thermoluminescent dosimeter element according to the present invention.
Figure 2B:
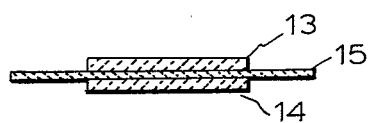
Figure 2C:
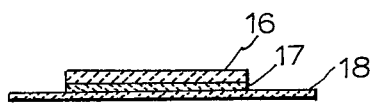

The basic construction of the dosimeters according to the present invention is illustrated in FIGS. 2A to 2C. Referring to FIG. 2A, numeral 11 represents a thermoluminescent phosphor chip of solid plate configuration. An infrared-radiation absorbing layer 12 is attached to the phosphor chip. As illustrated in FIG. 2B, a phosphor 13 and an infrared-radiation absorbing layer 14 may be provided on both sides of a thermally stable substrate 15. In this case the phosphor 13 does not necessarily have a plate configuration and may be granular or powdered. As illustrated in FIG. 2C, a phosphor 16 and an infrared-radiation absorbing layer 17 may be piled up on one side of a thermally stable substrate 18 which is transparent to infrared radiation.

The infrared-radiation absorbing layers 12, 14 and 17 may be of various materials as follows; layers obtained by coating resin in which such material is dispersed as carbon powder, finely divided metal powder of Ti, Ni or Au, or metal oxide such as CuO or FeO; deposited film of carbon or; layers obtained by oxidizing deposited metal film of Cu or Fe. The smaller the thickness of these layers, the better is the range in which uniformity can be obtained, in order to obtain a small heat capacity and a high heat transferring rate. A thickness less than 50μ is satisfactory. In one embodiment of this invention, polyimide varnish with carbon powder dispersed is coated and dried to form a layer 10μ thick.

Figure 3A:
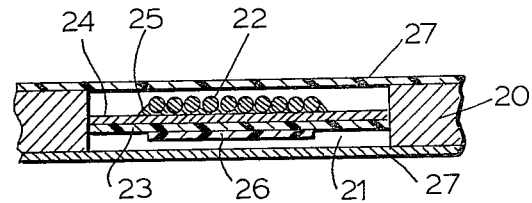
FIGS. 3A–3C are sectional views illustrating thermoluminescent dosimeter element embodying the present invention.
Figure 3B:
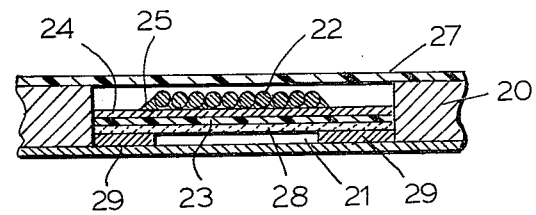
Figure 3C:
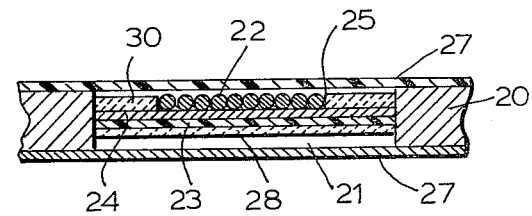

More specific constructions of the dosimeter are illustrated in FIGS. 3A to 3C.

Referring to FIG. 3A, a frame 20 has a hole 21 for mounting the phosphor layer 22. The frame 20, for example, may be an aluminum plate having a thickness of 1 mm provided with a hole having a diameter of 5 mm. Within the hole 21 a polyimide base 23 is mounted. On one side of the polyimide base 23 is formed a deposited aluminum film 24 and the phosphor 22 adheres to the aluminum film 24 by a polyimide adhesive 25. The aluminum film 24 is provided to reduce thermal radiation. The phosphor 22 is spaced from the frame 20 to prevent heat leaking by conduction during the measurement. On the other side of the polyimide base 23 is provided an infrared radiation absorbing layer 26 which is formed by coating a polyimide varnish with carbon dispersed powder. The infrared radiation absorbing layer 26 is positioned on the side opposite to the phosphor layer 22.

Both sides of above-mentioned construction are covered with transparent resin films 27 which serve as protective layers. These films 27 are required to have high transparency to both thermoluminescence and infrared radiation, but it is not objectionable to absorb infrared radiation to a limited extent if the film 27 is heat resistant. The film 27 may be fluoroplastics, nylon, polyester, triacetate, polycarbonate, vinylidene chloride, unplasticized PVC or polyethylene. Especially fluoroplastic film, polyester film, polycarbonate film or triacetate film are excellent because they did not change after 100 repetitions of the heating, cycle though the films of the other materials will deform somewhat. The film may also be a glass plate.

In the construction illustrated in FIG. 3A, it is important to form the infrared-radiation absorbing layer 26 directly under the phosphor layer 22 and with a area of the area of same size as the phosphor layer 22. If the area of the infrared-radiation absorbing layer 26 is smaller than that of the phosphor layer 22, the phosphor layer 22 is only partially heated. If larger, the temperature becomes extremely high at the portion beyond the phosphor layer 22 region, because the heat capacity of this portion is small. Thereby thermal radiation occurs, and in a bad case destruction by heat is caused. This problem is solved by the construction of FIGS. 3B and 3C.

Referring to FIG. 3B, an infrared-radiation absorbing layer 28 is formed on the whole surface of the base 23, thus the formation of layer 28 is easy. On the region beyond the phosphor layer 22 is provided a shield plate 29 for cutting off infrared rays.

In the example of FIG. 3C, the infrared-radiation absorbing layer 28 is formed in the same manner as the example of FIG. 3B. On the same side as the phosphor layer 22, a heat resistant layer 30 is provided so as to cover the region beyond the phosphor layer 22. Thus the heat capacity of unit area becomes uniform for both regions with the phosphor layer 22 provided and without it, so that extreme rise in temperature in heating process is prevented.

A more specific construction of the reading apparatus is described hereinafter, referring to FIG. 4.

An incandescent lamp 31 is provided as the infrared beam source. The power of lamp 31 at its rated voltage is 150 W. The lamp 31 is accompanied with a curved reflector 32 which focuses rays emitted from the lamp 31 to a spot having a diameter of 5 mm. A variable-voltage power supply 33 is provided for driving the lamp 31. A shutter 34 is provided in front of the lamp 31. A filter 35 transmits only infrared radiation with a wavelength above $1.1\mu$. It is a silicon wafer with a thickness of 1 mm and with both side surfaces being mirror-polished. A dosimeter 36 such as illustrated in FIGS. 3A–3C is placed next to the filter 35 in a manner so that the side having the infrared radiation absorbing layer is irradiated with infrared rays. The thermoluminescent phosphor layer has a diameter of 4 mm.

An optical guide 37 of quartz is positioned so as to transmit thermoluminescence from the dosimeter 36 to a photomultiplier 38. On the one end of the optical guide 37 is mounted a blue filter 39. The photomultiplier 38 is specially disigned for photon counting and is driven by a high-voltage power source 40. Output of the photomultiplier 38 is connected to a counter 41 which counts the number of the output pulses and indicates this number. The dosimeter 36, optical guide 37 and photomultiplier 38 are enclosed within a photo-shielding box 42. A sequence controller 43 is connected to the power supply 33, the shutter 34 and the counter 41. The sequence controlled 43 contains a timer and generates signals for operating and controlling the power supply 33, the shutter 34 and the counter 41. Numeral 44 represents a switch for starting the sequence controller 43.

There follows a presentation of the results of several experiments carried out by using the reading apparatus of FIG. 4. Dosimeters supplied for each experiment were previously irradiated with radiation.

EXPERIMENT 1

Dosimeters were prepared having construction such as that obtained by removing the infrared ray absorbing layer from the example of FIGS. 2A to 2C. Heatability was observed by irradiation with infrared rays thereon. In the case of the construction of FIG. 2A, as for the intensity of infrared radiation required for causing complete emission of thermoluminescence, the sample without the infrared radiation absorbing layer exhibits 4 times as large a heatability as the sample having it. In the case of FIGS. 2B and 2C, the samples without the infrared radiation absorbing layer exhibited 2 to 10 times as large as the sample therewith, though the results depend on the substrate material of the sample. Thus the infrared ray absorbing layer is remarkably effective in the dosimeter to be employed in infrared ray heating.

EXPERIMENT 2

Glow curves of the dosimeter were measured with the voltage supplied to the lamp 31 maintained constant and heating started by opening the shutter 35. FIG. 5 illustrates the glow curves corresponding to respective measurements performed with different voltages supplied to the lamp 31. The heat capacity of the dosimeter was 0.08 cal/deg.cm$^2$ and the phosphor was CaSO$_4$:Tm.

A curve I represents the glow curve of the case when a high voltage was supplied, so that the dosimeter was heated by strong infrared radiation. The solid line portion of the curve represents thermoluminescence. The emission was completed in 0.5 sec. Following the thermoluminescence thermal radiation was generated which is represented by doted line. This is caused by an excessive rise in temperature of the dosimeter because of the high intensity of the infrared radiation. In this case the before-mentioned requirement (2) was not satisfied.

If the voltage supplied to the lamp 31 is lower than in the case of the curves I, the glow curve becomes those represented by curves II or III. The curve III represents the case when the voltage is the lowest of the three cases. In this case, absorption and dissipation of heat in the dosimeter are in equilibrium at about 400° C., and it takes 4 to 5 seconds to complete the emission of thermoluminescence but thermal radiation is not emitted.

Even if the heat capacity of the dosimeter is varied by, for example, varying the thickness of the phosphor layer, the same results are obtained except the required intensity of infrared radiation, i.e. the voltage supplied to the lamp, varies relatively.

EXPERIMENT 3

Figure 6:
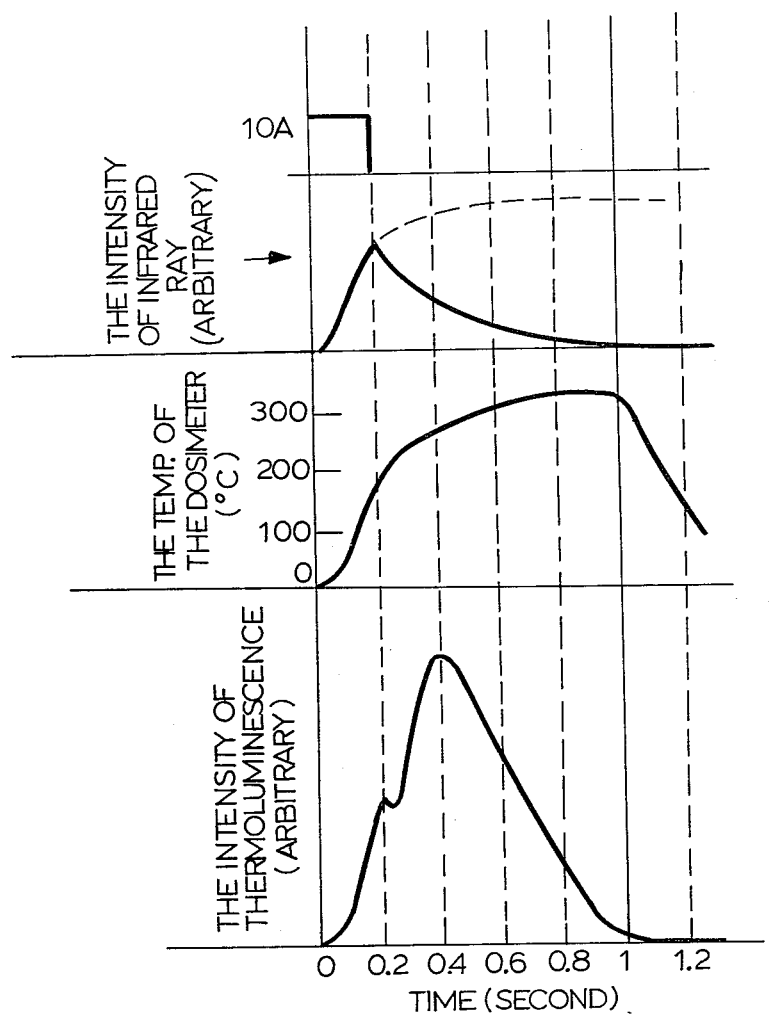
FIG. 6 is a timing chart of the heating of the thermoluminescent dosimeter by infrared beam heating according to the present invention.

With the shutter 34 being kept open, the lamp 31 was controlled by the sequence controller 43 so as to light for 0.2 seconds. The glow curve by this heating was measured and the intensity of infrared radiation irradiating to the dosimeter 36 and the temperature of the dosimeter 36 were measured at the same time. The results are illustrated in FIG. 6. The intensity of infrared radiation increases according to the time constant of the lamp for 0.2 seconds and then decays in 1 second. The temperature of the dosimeter reachs 300° C. in 0.6 seconds and does not exceed 320° C. The emission of thermoluminescence completed in 1 second and the amount of thermal radiation is quite small. Thus the previously mentioned two requirements are satisfied.

It is understood from the experiments 2 and 3, that the intensity of infrared radiation should be suitably programed, in order to realize the desirable condition for infrared radiation heating by an incandescent lamp.

Namely, if the heat is supplied so that the heat equilibrium is maintained at a temperature below the emission completion temperature, the measurement takes long time. Therefore the power supplied to the lamp should be so high enough that the heat equilibrium temperature is higher than the emission completion temperature. However in this case where the heat equilibrium temperature is higher than the temperature at which thermal radiation occurs, it is necessary to prevent thermal radiation noise.

According to the invention, the lamp is initially driven by power whereby the equilibrium temperature is higher than the temperature at which thermal radiation occurs. Then the power supplied to lamp is cut or decreased. Therefore the latter half of heating is performed by afterglow, so that temperature rise of the dosimeter becomes slow, followed by a decrease in temperature. Timing of the cut or decrease in power is determined so that the highest temperature of the dosimeter is higher than the emission completion temperature but does not exceed the temperature at which thermal radiation occurs. This timing should be determined according to the measuring system. Thus since the temperature rise during the latter half of heating is quite slow, the temperature of dosimeter easily falls into the required range.

Figure 7A:
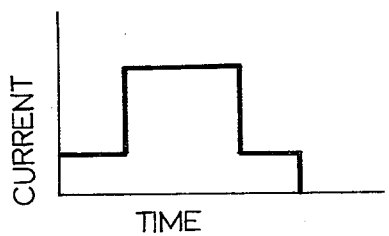
FIGS. 7A and 7B are graphs illustrating modified manners of supplying power to the incandescent lamp.
Figure 7B:
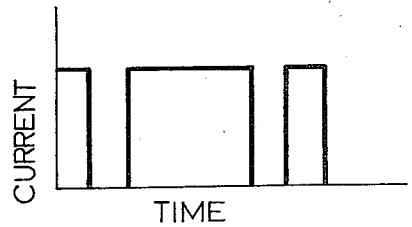

A lamp may be driven by a current such as illustrated in FIGS. 7A and 7B. In these cases, the part I works for preannealing to remove the fading effect of low temperature peaks and the part III works for postannealing to remove the residual dose perfectly. The a part II works for measurement of thermoluminescence. Therefore the part II should be considered to be controlled such as above-mentioned.

EXPERIMENT 4

In the embodiment illustrated in FIG. 4, the signal-to-noise ratio of the measurement of thermoluminescence is improved by the combined use of photon counting and the optical filter 39. The effect thus obtained is observed as hereinafter described.

Employing $CaSO_4$: Tm as the phosphor layer 22 and an optical filter having the spectral properties as illustrated by line b of FIG. 8B as the filter 39 experiments were performed in the following each conditions.

(1) Using a photomultiplier in the current measuring method without the filter 39.

(2) Using a photomultiplier in the current measuring method with the filter 39.

(3) Using a photomultiplier in the photon counting method without the filter 39.

(4) Using a photomultiplier in the photon counting method with the filter 39.

The results of these measurements are shown in the Table 1.

Table 1

| No. | using manner of a photomultiplier | filter | sensitivity | Noise thermal radiation | Noise dark current | the lowest detectable exposure |
|---|---|---|---|---|---|---|
| 1 | current measuring | without filter | $10 \times 10^{-12}$ C/mR | $2 \times 10^{-12}$C (0.2 mR) | $1 \times 10^{-12}$C (0.1 mR) | 0.6 mR |
| 2 | current measuring | with filter | $2.5 \times 10^{-12}$ C/mR | undetectable | $1 \times 10^{-12}$C (0.4 mR) | 1.2 mR |
| 3 | photon counting | without filter | 1500 count/mR | 300 count (0.2 mR) | 2 count (0.001 mR) | 0.6 mR |
| 4 | photon counting | with filter | 500 count/mR | 3 count (0.006 mR) | 2 count (0.004 mR) | 0.04 mR |

In the noise column of Table 1, the parenthesized values represent the equivalent amount of radiation.

The lowest detectable exposure in the Table 1 is defined as the lowest radiation amount detectable in the range of specific inaccuracy of ±30%, and is practically estimated at about three times as large as the largest noise. However when the photon counting is employed the lowest detectable exposure does not take a value below about 20 counts, because of the fluctuation of counting.

In the case of No. 1 in the table 1, the major noise is thermal radiation equivalent to 0.2 mR, so that the lowest detectable exposure is 0.6 mR which is obtained by multiplaying 0.2 mR by 3. In the case of No. 2, the thermal radiation is undetectable but since the sensitivity is small, the lowest detectable exposure which is determined by the dark current becomes large. In the case of No. 3, the dark current is small but the thermal radiation is not improved. In the case of No. 4, both the thermal radiation and the dark current are small such as 0.004 mR, so that the lowest detectable exposure is determined by counting fluctuations. The lowest detectable exposure value is 0.04 mR which is improved by more than one order of magnetic.

EXPERIMENT 5

Figure 8A:
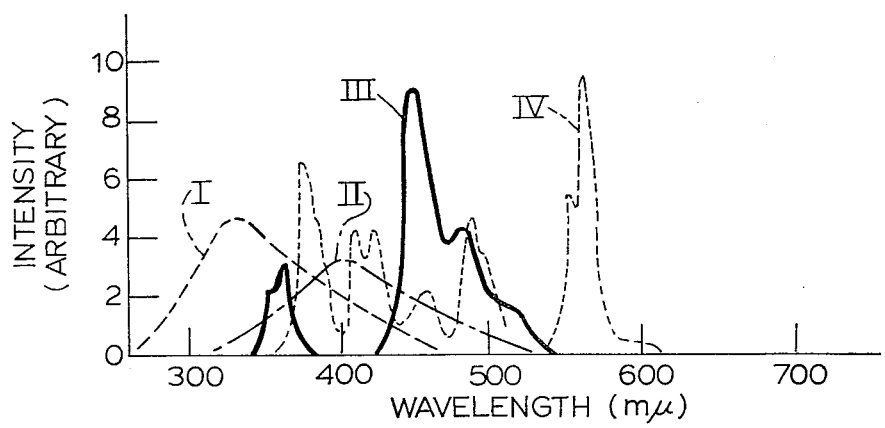
FIG. 8A is a graph illustrating emission spectra of several kinds of thermoluminescent phosphors.
Figure 8B:
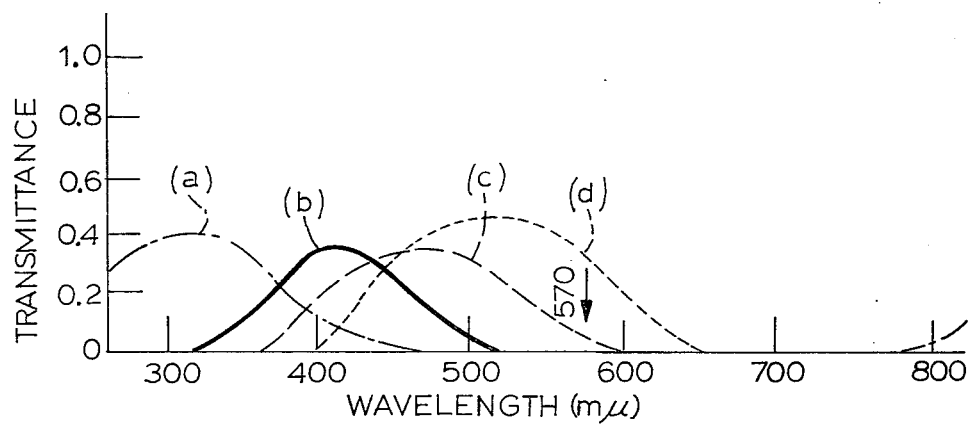
FIG. 8B is a graph illustrating absorption spectra of several kinds of optical filters.

The lowest detectable exposure in case when the above mentioned method (4) is employed was measured for several combinations of different thermoluminescent phosphors and filters. FIG. 8A illustrates the emission spectrum of the employed phosphors where curve I represents the emission spectrum of BeO(na), II LiF, III CaSO$_4$(Tm), IV Mg$_2$SiO$_4$(Tb), and V Li$_2$B$_4$O$_7$(Mn). FIG. 8B illustrates curves representing the transmittance of various filters of colored glass. The results are shown in the table 2 as the amount of improvement of the signal to noise ratio in dB in comparison with the case for each combination in which the measurement is performed without a filter by the current measuring method.

Table 2

| Filter | Phosphor BeO(Na) | LiF | CaSO$_4$(Tm) | Mg$_2$SiO$_4$(Tb) |
| --- | --- | --- | --- | --- |
| (a) | 22 dB | 18 dB | 24 dB | 17 dB |
| (b) | 24 dB | 22 dB | 24 dB | 19 dB |
| (c) | 14 dB | 20 dB | 20 dB | 23 dB |
| (d) | −3 dB | 4 dB | 3 dB | 6 dB |

The symbols (a), (b), (c) and (d) of the filter column in the Table 2 correspond to the symbols in FIG. 8B.

What is claimed is:

1. A thermoluminescent dosimeter for use in a system wherein the dosimeter is exposed to radiation and is then heated to a temperature for production of thermoluminescence by irradiation with infrared rays, said dosimeter comprising:
   a substrate having a pair of opposed main sides;
   a thermoluminescent material layer disposed on one main side of said substrate; and
   an infrared ray absorbing layer disposed on the other main side of said substrate.

2. A thermoluminescent dosimeter as claimed in claim 1, wherein
   a deposited aluminum film is provided between said substrate and said thermoluminescent material layer.

3. A thermoluminescent dosimeter as claimed in claim 1, wherein
   a shield layer for cutting off infrared ray is provided, being positioned on the reverse side of said substrate from said thermoluminescent material layer and at the area of the substrate beyond the thermoluminescent material layer.

4. A thermoluminescent dosimeter as claimed in claim 1, wherein
   a heat resistant layer is provided, being positioned on the same side of said substrate as the thermoluminescent material layer and covering said side of said substrate except the thermoluminescent material layer.

5. An improved method for reading a thermoluminescent dosimeter wherein a dosimeter having been exposed to radiation is heated to a temperature for production of thermoluminescense and the amount of thermoluminescence is measured to determine the dose, said improvement comprising:
   driving an incandescent lamp with a voltage pulse;
   directing radiation from said incandenscent lamp onto the dosimeter for radiating the dosimeter with infrared radiation from said incandescent lamp for quickly raising the temperature of the dosimeter to near the optimum temperature for production of thermoluminescence; and,
   after termination of the voltage pulse, continuing to direct infrared radiation from the afterglow of said incandescent lamp onto said dosimeter for slowly raising the temperature of the dosimeter to the optimum temperature for thermoluminescence and for keeping the temperature of the dosimeter near the optimum temperature.

6. An improved method as claimed in claim 5, wherein the step of driving said lamp with the voltage pulse comprises providing a voltage pulse having first, second and third portions, said first portion having a voltage form for preannealing the dosimeter to remove the fading effect of low temperature peaks, said second portion having a voltage form for heating the dosimeter to near the optimum temperature and said third portion having a voltage form for postannealing the dosimeter for removal of the residual dose.

* * * * *